June 22, 1954
C. B. LUBBERT
2,681,668
ARTICLE-ASSEMBLING APPARATUS
Filed May 8, 1951
3 Sheets-Sheet 1
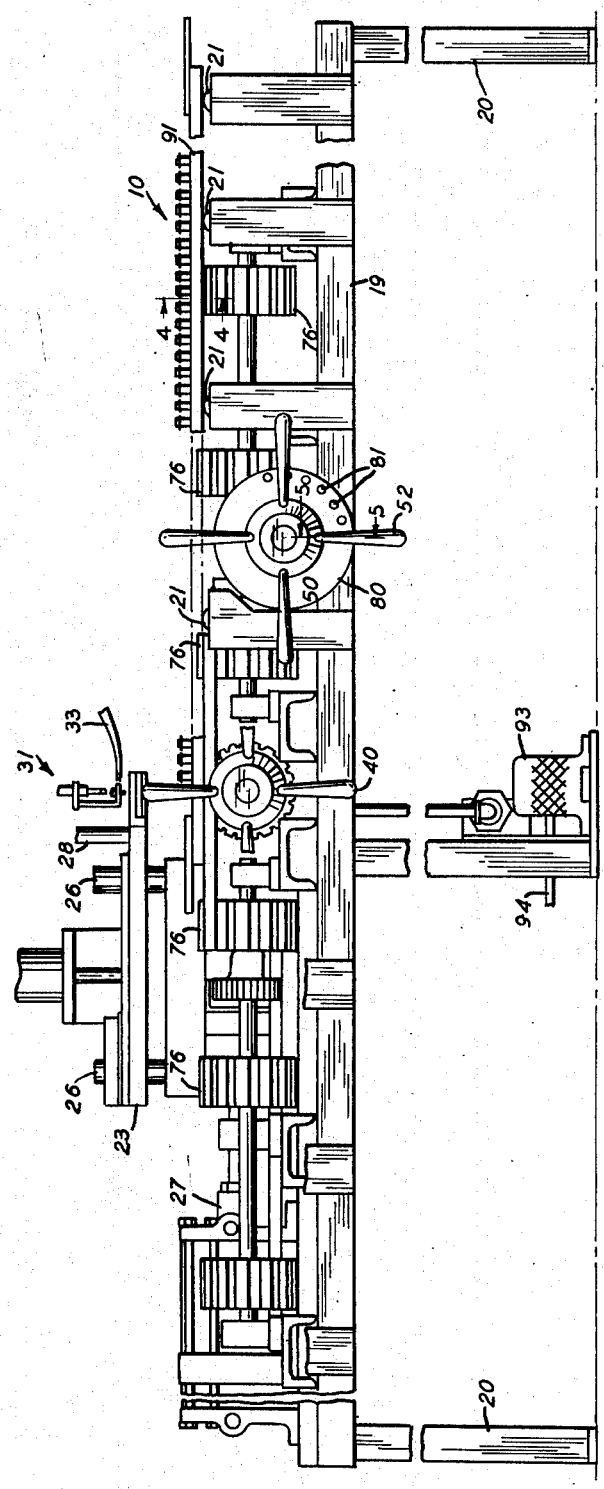
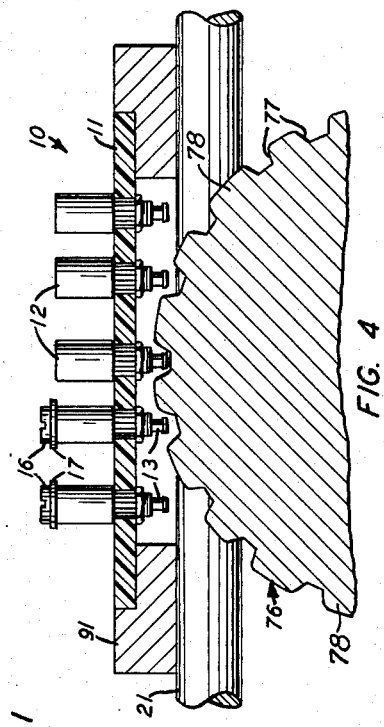
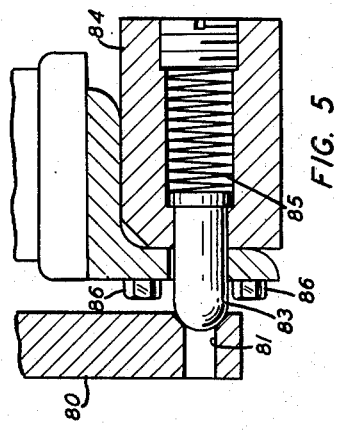
INVENTOR
C. B. LUBBERT
BY
ATTORNEY June 22, 1954

C. B. LUBBERT 2,681,668

ARTICLE-ASSEMBLING APPARATUS

Filed May 8, 1951

INVENTOR
C. B. LUBBERT
BY
ATTORNEY

June 22, 1954

C. B. LUBBERT 2,681,668

ARTICLE-ASSEMBLING APPARATUS

Filed May 8, 1951

INVENTOR
C. B. LUBBERT
BY
ATTORNEY

Patented June 22, 1954

2,681,668

UNITED STATES PATENT OFFICE 2,681,668

ARTICLE-ASSEMBLING APPARATUS

Carl B. Lubbert, Anneslie, Md., assignor to Western Electric Company, Incorporated, New York, N. Y., a corporation of New York Application May 8, 1951, Serial No. 225,188

8 Claims. (Cl. 144—32)

This invention relates to article-assembling apparatus, and more particularly to apparatus for assembling articles on terminal strips used in conjunction with communications apparatus.

One type of terminal strip used in conjunction with communications apparatus includes a flat base having a plurality of terminal studs secured spacedly thereon in parallel rows extending longitudinally along the base. Each stud is provided with a washer and a screw for attaching a wire to one end the stud. It is obvious that it would be time consuming and consequently a costly operation to assemble a washer and screw on each stud manually. Usually, the longitudinal and transverse spacing of the individual studs on the base varies to facilitate easy wiring of the terminal strip to associated apparatus.

An apparatus for automatically assembling a screw and a washer on the studs, and having conventional indexing devices which are adjustable to suit the spacing between the studs and to obtain an accurate alignment of the threaded parts to be assembled, would result in a complicated and expensive apparatus. The present invention relates to an apparatus which is simple and inexpensive to manufacture, and yet provides an accurate alignment of threaded parts so that they may be readily assembled without using complicated and expensive indexing devices.

An object of the invention is to provide new and improved article-assembling apparatus.

Another object of the invention is to provide new and improved apparatus for assembling articles on terminal strips used in conjunction with communications apparatus.

An apparatus which embodies certain features of the invention, and is intended to assemble articles on a part having a plurality of projecting elements thereon, may include an arm for holding an article to be assembled on such a part, means designed to engage the projecting elements of the part for moving the part with respect to the arm, and means for indexing the part-moving means to align the projecting elements of the part with the article-holding arm.

Other objects and advantages of the invention will appear from the detailed description of a specific embodiment thereof, when read in conjunction with the appended drawings, in which:

Fig. 1 is a front elevation of an article assembling apparatus embodying the invention;

Fig. 4 is an enlarged fragmentary section taken along line 4—4 of Fig. 1, and

Fig. 5 is an enlarged fragmentary vertical section taken along line 5—5 of Fig. 1.

Figure 2:
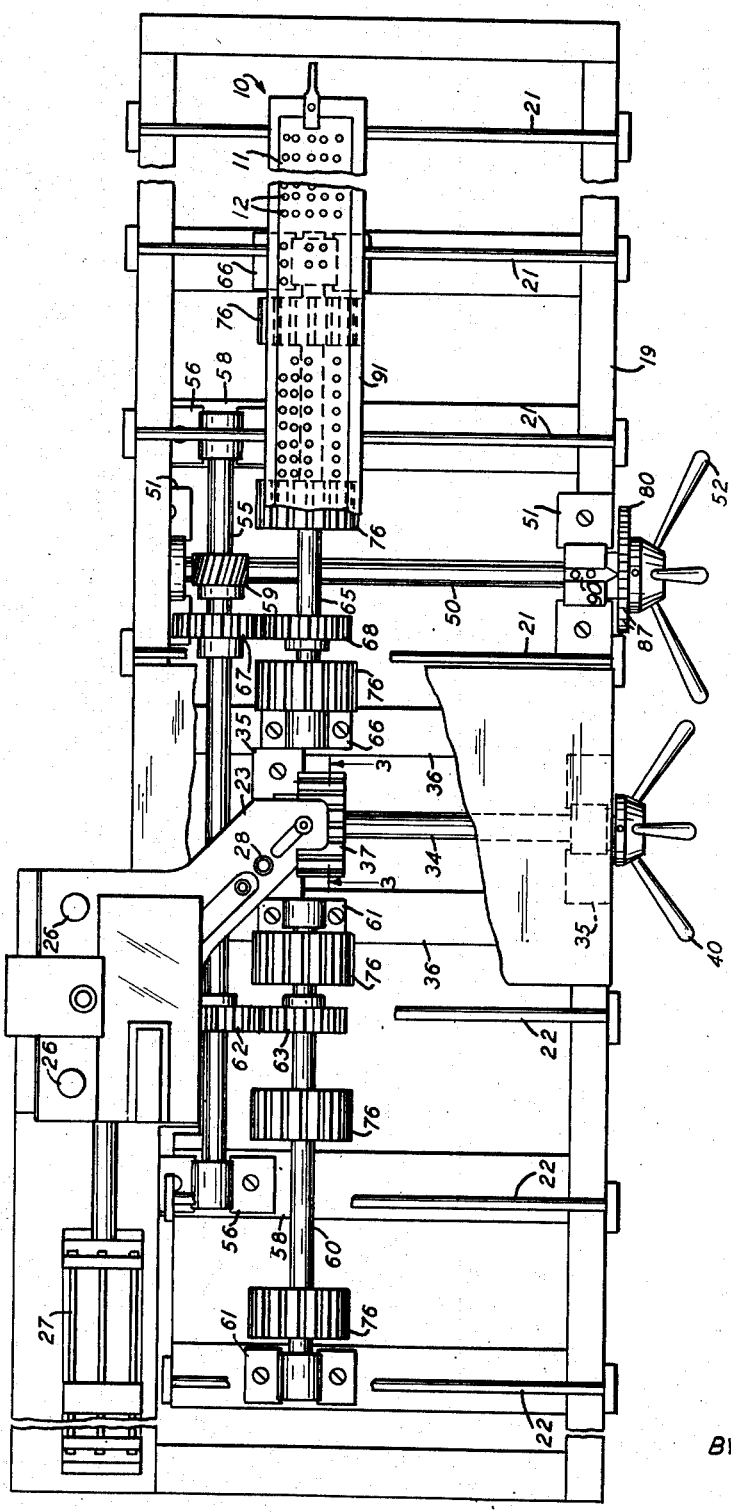
Fig. 2 is a plan view of the apparatus shown in Fig. 1.
Figure 3:
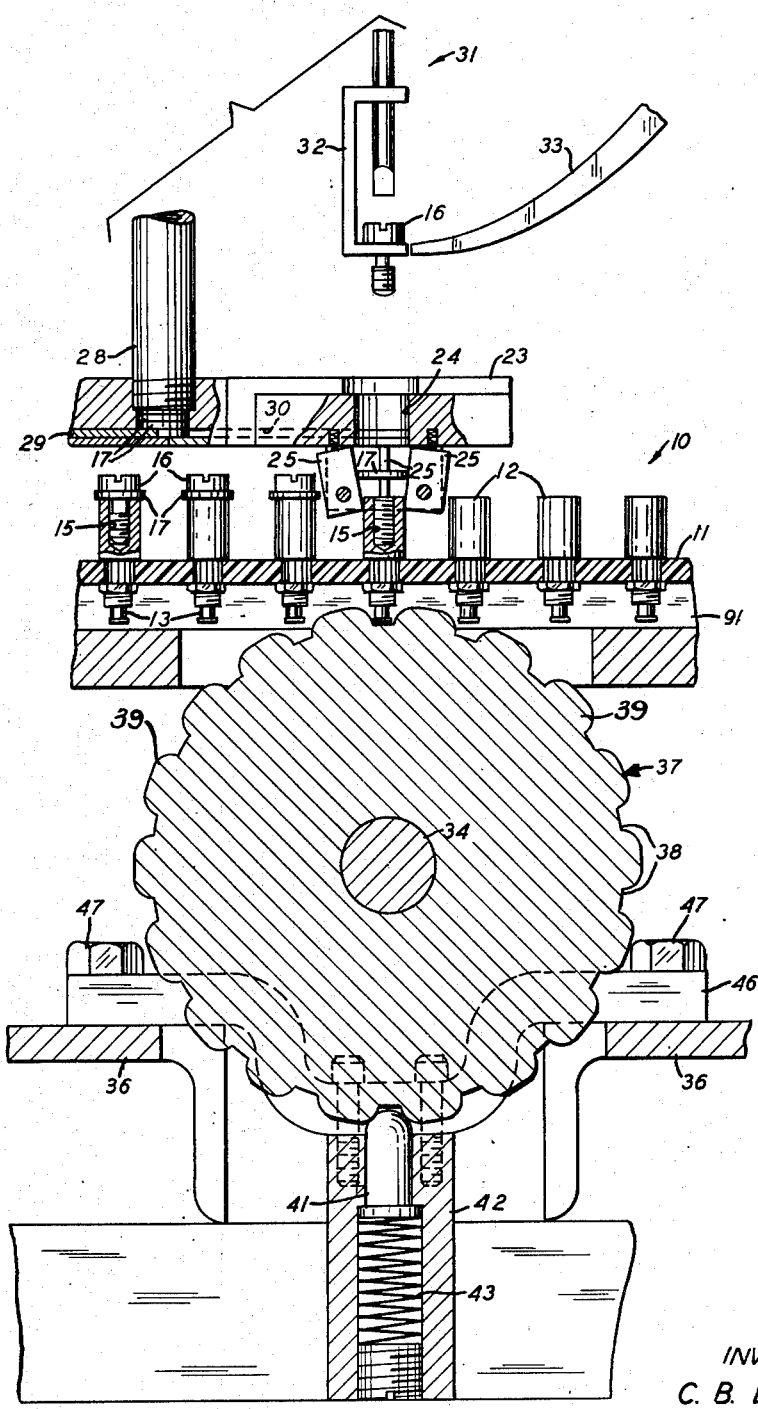
Fig. 3 is an enlarged vertical section taken along line 3—3 of Fig. 2.

Referring now to the drawings, and more particularly to Figs. 2 and 3, there is shown an apparatus for assembling articles on an elongated terminal strip, a portion of which is indicated by the numeral 10, which includes a flat, elongated base 11 made of insulating material and having a plurality of terminal studs 12—12 positioned spacedly in parallel rows longitudinally on one side of the base. Each terminal stud 12 has an end portion 13 extending beyond the opposite side of the base to which a wire may be soldered. The opposite ends of the studs are provided with tapped holes 15—15 to receive screws 16—16 which hold washers 17—17 on the studs. The screws 16—16 and the washers 17—17 are provided for making wiring connections to the terminal studs. The transverse spacing between the longitudinal rows of studs 12—12 varies from row to row as seen in Fig. 4.

An apparatus for assembling a screw 16 and a washer 17 on each of the studs 12—12, may include a rectangular frame 19 (Figs. 1, 2 and 3) mounted on legs 20—20. A set of rollers 21—21 is provided at the right hand side of the frame, and another set of rollers 22—22 is provided at the left hand side of the frame for movably supporting the terminal strip 10 beneath an arm 23. The arm 23 is provided with an aperture 24 and pivotally mounted fingers 25—25 for holding a washer 17 above a stud 12 aligned with the aperture 24. The arm 23 is mounted slidably on guide pins 26—26 and is moved by an air cylinder 27 upwardly to a position in which the fingers 25—25 clear the terminal posts 12—12 (Fig. 3) and downwardly to a position in which the fingers 25—25 are positioned astride a terminal post as seen in Fig. 3.

A plurality of washers 17—17 are stored in a tube 28, and each time the air cylinder lowers the arm 23, it moves a finger 29 so as to slide a washer 17 from the end of the tube 28 through a slot 30 and into the aperture 24 where it is held by the fingers 25—25. When the arm 23 is in its lowermost position, an automatic screwdriver apparatus 31 is operable to drive a screw 16 held in a finger 32 of the apparatus into the tapped bore 15 of a stud 12 positioned under the arm 23. A supply chute 33 of the screwdriver apparatus 31 feeds screws 16—16 in a position to be engaged by the finger 32.

The arm 23 and its associated washer feeding apparatus are described fully and claimed in copending application Serial No. 225,160, filed May 8, 1951, by C. H. Trimble. Therefore, they have been described herein only insofar as is necessary for a complete understanding of the invention.

An apparatus for accurately indexing the studs 12—12 of the terminal strip 10 with respect to the arm 23 which holds the washer and the screwdriver apparatus 31 which holds a screw in position for assembly on the studs, includes a shaft 34 (Fig. 2) journalled in bearings 35—35 mounted on supporting channels 36—36 positioned transversely across the frame 19. An indexing wheel 37 having a plurality of grooves 38—38 forming teeth 39—39 equally spaced about the periphery thereof is secured to the shaft 34. A handwheel 40 is secured to an end of the shaft 34 protruding beyond the one side of the frame for imparting rotation to the shaft 34 and the indexing wheel 37 in either direction. The axis of rotation of the shaft 34 is aligned with the transverse axis of the aperture 24 in the arm 23, and the wheel 37 is positioned directly beneath the aperture in the arm.

The indexing wheel 37 is held in a position in which one of the grooves 38 always is aligned with the transverse axis of the aperture 24 of the arm 23 by a plunger 41 mounted slidably in a support 42 and urged in one of the grooves 38 of the wheel by a spring 43. The support 42 is attached to a saddle 46 which is secured to the channels 36—36 by means of bolts 47—47 so that the plunger 41 engages the groove that is diametrically opposed to the groove positioned directly beneath the transverse axis of the aperture 24 in the arm 23.

A shaft 50 journalled in bearings 51—51 mounted on the frame 19 is provided with a handwheel 52 secured on a portion of the shaft 50 extending beyond the frame 19, as seen in Fig. 2. Rotation of the shaft 50 by operation of the wheel 52 turns a shaft 55 journalled in bearings 56—56 supported by transverse members 58—58 by means of a worm secured on the shaft 50 and engaging a worm gear 59 secured on the shaft 55. A shaft 60 journalled in bearings 61—61 is turned by the shaft 55 through a gear 62 secured to the shaft 55 and a gear 63 secured to the shaft 60. A shaft 65 journalled in bearings 66—66 also may be turned by the shaft 55 by means of a gear 67 secured on the shaft 55 and a gear 68 secured on the shaft 65.

Indexing wheels 76—76, having grooves 77—77 forming teeth 78—78 provided around their periphery, are secured spacedly on the shafts 60 and 65, as seen in Figs. 1 and 2. The indexing wheels 76—76 are identical in construction, each wheel having a predetermined number of the grooves 77—77 and teeth 78—78 spaced around a portion of the periphery thereof to suit the transverse spacing of the studs 12—12 on the terminal strip 10. The longitudinal axes of rotation of the shafts 60 and 65 are aligned with each other and with the longitudinal axis of the aperture 24 of the arm 23, and the indexing wheels 76—76 are secured on the shafts 60 and 65 so that the grooves 77—77 and teeth 78—78 of the wheels are aligned longitudinally.

The grooves 77—77 and teeth 78—78 of indexing wheels 76—76 are aligned with the longitudinal axis of the aperture 24 of the arm 23 by means of an indexing plate 80 secured on the shaft 50 (Fig. 2) adjacent to the handwheel 52. The plate 80 is provided with a series of tapered holes 81—81 (Fig. 5) provided near the periphery of the plate 80 so as to be engaged by a plunger 83 mounted slidably in a bar 84 and urged into engagement with the tapered holes 81—81 by a spring 85. The bar 84 is secured to the frame 20 by bolts 86—86. The holes 81—81 are spaced apart a distance proportional to the transverse spacing of the studs 12—12 on the terminal strip, and the plate 80 is secured to the shaft 50 so that when the plunger 83 engages one of the holes 81—81, one set of aligned grooves 77—77 of the wheels 76—76 is aligned longitudinally with the longitudinal axis of the aperture 24 in the arm 23. The holes 81—81 are provided in the second quadrant of the plate, as viewed in Fig. 1, and when the plunger 83 engages the left hand aperture 81, the handwheel 52 and the indexing wheels 76—76 are in their starting position which is indicated on a scale 87 provided on a portion of the periphery of the plate 80 by a pointer 90.

The grooves provided in the periphery of the indexing wheels 37 and 76—76 have a width slightly greater than the diameter of the ends 13—13 of the terminal studs 12—12. A rectangular frame 91 is provided for supporting the base 11 on the rollers 21—21 and 22—22. The rollers 21—21 and 22—22 are spaced above the frame 19 a distance sufficient to support the frame 91 so that the ends 13—13 of the terminal studs fit snugly into the grooves but do not engage the bottom of the grooves provided in the indexing wheels. A foot operated valve 93 is provided for admitting air from a supply line 94 to the air cylinder 27 to raise and lower the arm 23 as the studs are aligned successively with the arm. When a terminal strip 10 is positioned on the rollers 21—21 and 22—22, the ends 13—13 of a number of the studs 12—12 in a longitudinal row are positioned in the grooves 77—77 of the wheels 76—76, and the stud of the same longitudinal row that is to receive a screw and washer is positioned in a groove in the wheel 37.

*Operation*

The handwheel 52 is turned to position the scale 87 provided on the periphery of the plate 80 so that the starting point for the series of holes 81—81 is opposite the pointer 90. A terminal strip assembly 10 is placed in the frame 91 and the frame and terminal strip are placed on the rollers 21—21 so that the longitudinal row of terminal studs 12—12 nearest the handwheels 40 and 52 is aligned with the grooves 77—77 in the indexing wheels 76—76, in which position, the ends 13—13 of some of the studs rest in the grooves 77—77. The frame 91 rests on the rollers 21—21 with the ends 13—13 of the studs fitting into the grooves 77—77, but spaced a slight distance above the bottoms of the grooves to allow for variation in the lengths of the studs 12—12. The widths of the grooves 77—77 in the wheels 76—76 are such that the ends 13—13 of the studs fit neatly into the grooves with a minimum clearance between the ends 13—13 and the walls of the grooves.

When the terminal strip 10 is positioned on the indexing wheels 76—76 in this manner, the longitudinal row of terminal studs nearest the handwheels 40 and 52 is aligned with the longitudinal axis of the aperture 24 in the arm 23. The terminal strip then is positioned so that the left hand stud of this longitudinal row of studs engages the indexing wheel 37. The handwheel 40 is turned in a counterclockwise direction, as viewed in Fig. 1, to move the terminal strip 10 to the left and to locate this stud directly beneath the aperture 24 in the arm 23.

The foot operated valve 93 is actuated to admit air to the cylinder 27 to move the arm 23 downwardly and slide the finger 29 to the right so that it pushes a washer 17 from the end of the tube 28 into the aperture 24. The screwdriver 32 then is operated downwardly to slide the screw from the finger 32 and thread the screw through the washer into the tapped bore 15 provided in the stud. The screwdriver apparatus is arranged to terminate its downward stroke automatically and to return to its uppermost position when the screw is properly threaded into the stud. Then the valve 93 is released to cause the cylinder to raise the arm 23 to its uppermost position so that the next stud may be aligned with the aperture 24 and the screwdriver 31 by the indexing wheel 37.

After this occurs, the handwheel 40 is turned in a counterclockwise direction to move the terminal strip 10 to the left until the spring-pressed plunger 41 is seated in the next succeeding groove 38 and stops the rotation of the indexing wheel 37. In this position, the indexing wheel 37 aligns the next succeeding stud 12 in the longitudinal row of studs engaged by the grooves 77—77 of the indexing wheels 76—76 with the aperture 24 in the arm 23. The valve 93 is actuated again to admit air to the cylinder 27 to move the arm 23 downwardly and move the finger 29 to the left to position another washer on by the fingers 25—25. The screwdriver 32 again is actuated to thread a screw in the tapped bore of the stud aligned with the aperture 24 of the arm 23. This procedure is followed until all the studs have been successively advanced and a screw 16 and a washer 17 have been attached to each of the studs in the longitudinal row of studs engaged by the grooves 77—77 in the wheels 76—76.

When each of the studs in the first row has received a washer and screw, the handwheel 52 is turned in a clockwise direction, as viewed in Fig. 1, to turn the indexing wheels 76—76 in a counterclockwise direction, as viewed in Fig. 4, until the plunger 83 engages the next succeeding aperture 81 in the plate 80. This movement of the wheels 76—76 aligns the next longitudinal row of terminal studs with the longitudinal axis of the aperture 24 of the arm 23. The frame 91 now is resting on the set of rollers 22—22 provided on the left hand portion of the frame 19 with the right hand stud of the second row of terminal studs directly under the aperture 24 of the arm 23.

The valve 93 is actuated to admit air to the cylinder 27 and move the arm 23 downwardly and actuate the finger 29 to position a washer in the fingers 25—25 of the arm. The screwdriver 32 then is actuated to thread a screw held by the finger 32 into the terminal stud positioned under the arm 23. The hand wheel 40 is turned in a clockwise direction, as seen in Fig. 1, to move the terminal strip 10 to the right and to position each stud of the second row of studs successively under the arm 23 so that a screw and washer may be assembled on the studs in the manner described.

These operations are repeated until each longitudinal row of studs on the terminal strip 10 is indexed with respect to the arm 23 by successive movements of the handwheel 52, each stud of each longitudinal row of studs is positioned successively under the arm 23 by the indexing wheel 37 and each of the studs on the terminal strip has received a washer and screw. During these operations the terminal strip 10 is moved in successive steps from the rear toward the front of the apparatus, and is moved in successive steps alternately from the right to the left and from the left to the right of the apparatus.

The longitudinal rows of studs 12—12 on the terminal strip assembly 10 are accurately aligned with respect to the aperture 24 and the fingers 26—26 of the arm 23 by the grooves 77—77 in the indexing wheels 76—76. The accurate alignment of the studs with respect to the arm 23 permits the screws to be threaded in the studs without damage to the threads of the stud or the screw. The indexing wheels 37 and 76—76 engage the ends 13 of the studs and thereby assure proper longitudinal and transverse alignment of the studs with respect to the arm 23. The spacing between the grooves 77—77 of the indexing wheels 76—76 provides an accurate alignment of the studs with respect to the arm 23 even though the spacing between the studs varies from row to row as seen in Fig. 4. The indexing wheels 76—76 have such a thickness that they provide a series of longitudinally aligned grooves for guiding a row of studs as each stud is moved under the arm 23. The longitudinal grooves 77—77 formed in the indexing wheels 76—76 and the transverse grooves 38—38 formed in the indexing wheel 37 prevent lateral and longitudinal movement of the terminal strip with respect to the arm 23 when the wheels are held against movement by their respective spring pressed pins 41 and 83, and thereby maintain accurate alignment of the studs with the screw and the washer while they are attached to a particular stud positioned under the arm 23.

While the above-described apparatus is particularly adapted for indexing a terminal strip with respect to an apparatus for threading a screw into the terminal studs thereof, it may be readily adapted to index various piece parts having projecting elements thereon with respect to an article-assembling apparatus without departing from the spirit and scope of the invention.

What is claimed is:

1. An apparatus for assembling articles on a part having a plurality of projecting elements secured spacedly thereon in longitudinal and transverse rows, which comprises an arm for holding articles to be assembled on the part in a predetermined position, means for supporting the part movably longitudinally with respect to the longitudinal axis of the arm, a rotatable member having a plurality of teeth spaced apart a distance to suit the longitudinal spacing of the projecting elements for moving the part longitudinally with respect to the arm, a second rotatable member having a plurality of teeth spaced apart a distance equal to the transverse spacing of the individual projecting elements on the part for moving the part transversely with respect to the arm, means for actuating the first-mentioned rotatable member so as to align each element in the longitudinal rows of elements successively with the arm, and means for actuating the second-mentioned rotatable member to align each longitudinal row of the projecting elements on the part with the longitudinal axis of the arm.

2. An apparatus for assembling articles on a part having a plurality of projecting elements secured spacedly thereon in longitudinal rows and transverse rows, which comprises an arm for holding articles to be assembled on the part in a predetermined position, means for supporting the part movably with respect to the arm, a wheel having teeth provided on its periphery to engage the projecting elements of the part and rotatable about an axis aligned with the transverse axis of the arm, said teeth on the wheel being spaced apart to suit the longitudinal spacing of the projecting elements on the part, means for turning the wheel to move the part longitudinally with respect to the arm, means for indexing the wheel so that it aligns the projecting elements of a longitudinal row of elements successively with the arm, a plurality of wheels rotatable about a common axis aligned with the longitudinal axis of the arm, each of said second-mentioned wheels having a plurality of grooves spaced about the periphery to suit the transverse spacing of the projecting elements on the part, said second-mentioned wheels being oriented so that one of the grooves of each wheel simultaneously engages the projecting elements in the longitudinal row of elements, means for turning the second-mentioned wheels to move the part longitudinally with respect to the arm, and means for indexing the second-mentioned turning means to position the second-mentioned wheels so that each longitudinal row is aligned successively with the longitudinal axis of the arm.

3. An apparatus for assembling a screw and washer on a terminal strip having a plurality of projecting studs secured spacedly thereon in longitudinal rows and transverse rows, which comprises an arm for holding a screw and washer in a predetermined position, a rectangular frame, means provided on the frame for supporting the terminal strip movably with respect to the arm, a wheel rotatable about an axis aligned with the transverse axis of the arm and having a plurality of grooves provided about its periphery to engage the projecting studs provided of the terminal strip, said grooves being spaced apart on the wheel to suit the longitudinal spacing of the individual studs on the terminal strip, means for turning the wheel to move the terminal strip longitudinally with respect to the arm, indexing means mounted on the frame for positioning the indexing wheel so that its grooves align each stud in a longitudinal row of studs successively in a position to receive the screw and washer held by the arm, a plurality of wheels mounted rotatably on a common axis aligned with the longitudinal axis of the arm, each of the second-mentioned wheels having grooves provided in the periphery thereof to engage the projecting studs on the terminal strip as they are advanced past the arm by the first-mentioned wheel, the grooves in the second-mentioned indexing wheel being spaced about the periphery to suit the transverse spacing of the studs on the terminal strip, means for actuating the second-mentioned indexing wheels to move the terminal strip longitudinally with respect to the arm, and means for indexing the second-mentioned indexing wheels so that the grooves thereof align each longitudinal row of studs successively with the longitudinal axis of the arm, whereby each stud of the terminal plate may be aligned with the arm to receive a washer and screw.

4. Apparatus for assembling articles on a part having a plurality of spaced projecting elements secured thereon, which comprises an arm for holding articles to be assembled on the projecting elements, a rotatable disk having a plurality of grooves forming teeth spaced about the periphery thereof designed to engage the projecting elements, said grooves being spaced apart to coincide with the spacing of the projecting elements, a manually operable shaft upon which the rotatable disk is fixedly mounted for rotation therewith, and means for indexing the rotatable disk to successively engage the projecting elements for moving the part with respect to the arm and accurately position successive elements therebeneath.

5. Apparatus for assembling articles on a part having transversely spaced rows of projecting elements secured thereon, which comprises an arm for holding articles to be assembled on the projecting elements, a rotatable disk having a plurality of grooves forming teeth spaced about the periphery thereof designed to engage the projecting elements, said grooves being spaced apart to coincide with transverse spacing of the projecting elements, a manually operable shaft upon which the rotatable disk is fixedly mounted for rotation therewith, and means for indexing the rotatable disk to successively engage the projecting elements for moving the part transversely with respect to the arm and accurately position successive elements therebeneath.

6. Apparatus for assembling articles on a part having longitudinal rows of spaced projecting elements thereon, which comprises an arm for holding articles to be assembled on the projecting elements, a rotatable disk having a plurality of grooves forming teeth spaced about the periphery thereof designed to engage portions of the projecting elements on the part for moving said part longitudinally with respect to the arm, said grooves being spaced apart to coincide with the longitudinal spacing of the projecting elements, a rotatable shaft positively connected to the disk, means for actuating the shaft to rotate the disk whereby the grooves therein engage successively the projecting elements, and a spring-pressed detent for engaging successive grooves in the disk to accurately position a projecting element beneath the arm.

7. Apparatus for assembling articles on a part having transversely spaced rows of projecting elements thereon, which comprises an arm for holding articles to be assembled on the projecting elements, a rotatable disk having a plurality of grooves forming teeth spaced about the periphery thereof designed to engage portions of the projecting elements on the part for moving said part transversely with respect to the arm, said grooves being spaced apart to coincide with the transverse spacing of the projecting elements, a rotatable shaft positively connected to the disk, means for actuating the shaft to rotate the disk whereby the grooves therein engage successively the projecting elements, an index plate secured to the shaft and having a plurality of spaced apertures provided therein, and a spring-pressed detent for engaging the apertures in said plate to accurately position a row of projecting elements beneath the arm.

8. Apparatus for assembling articles on a part having a plurality of longitudinal rows of spaced projecting elements secured thereon, which comprises an arm for holding articles to be assembled on the projecting elements, a rotatable disk having a plurality of grooves forming teeth spaced about the periphery thereof designed to engage the projecting elements of the part for moving the part transversely with respect to the arm, said grooves being spaced apart to coincide with the transverse spacing between adjacent rows of elements, a shaft for positively rotating said disk in either direction, means for indexing said first disk to align successive longitudinal rows of elements beneath the arm, a second rotatable disk having a plurality of grooves forming teeth spaced about the periphery thereof designed to engage the projecting elements of the part for moving the part longitudinally with respect to the arm, said grooves in the second disk being spaced apart to coincide with the longitudinal spacing of the projecting elements, a second shaft for positively rotating said second disk in either direction, and means for indexing the second disk to successively engage and position projecting elements of the aligned longitudinal row beneath the arm.

References Cited in the file of this patent

UNITED STATES PATENTS

| Number | Name | Date |
| --- | --- | --- |
| 1,081,709 | Winkler | Dec. 16, 1913 |
| 1,560,918 | Stubgen | Nov. 10, 1925 |
| 1,842,830 | Holmes | Jan. 26, 1932 |
| 2,270,300 | Hothersall | Jan. 20, 1942 |
| 2,460,379 | Corren | Feb. 1, 1949 |
| 2,542,988 | Bureau | Feb. 27, 1951 |